May 2, 1961  W. E. HART  2,982,180
STORES LAUNCHER
Filed March 21, 1958
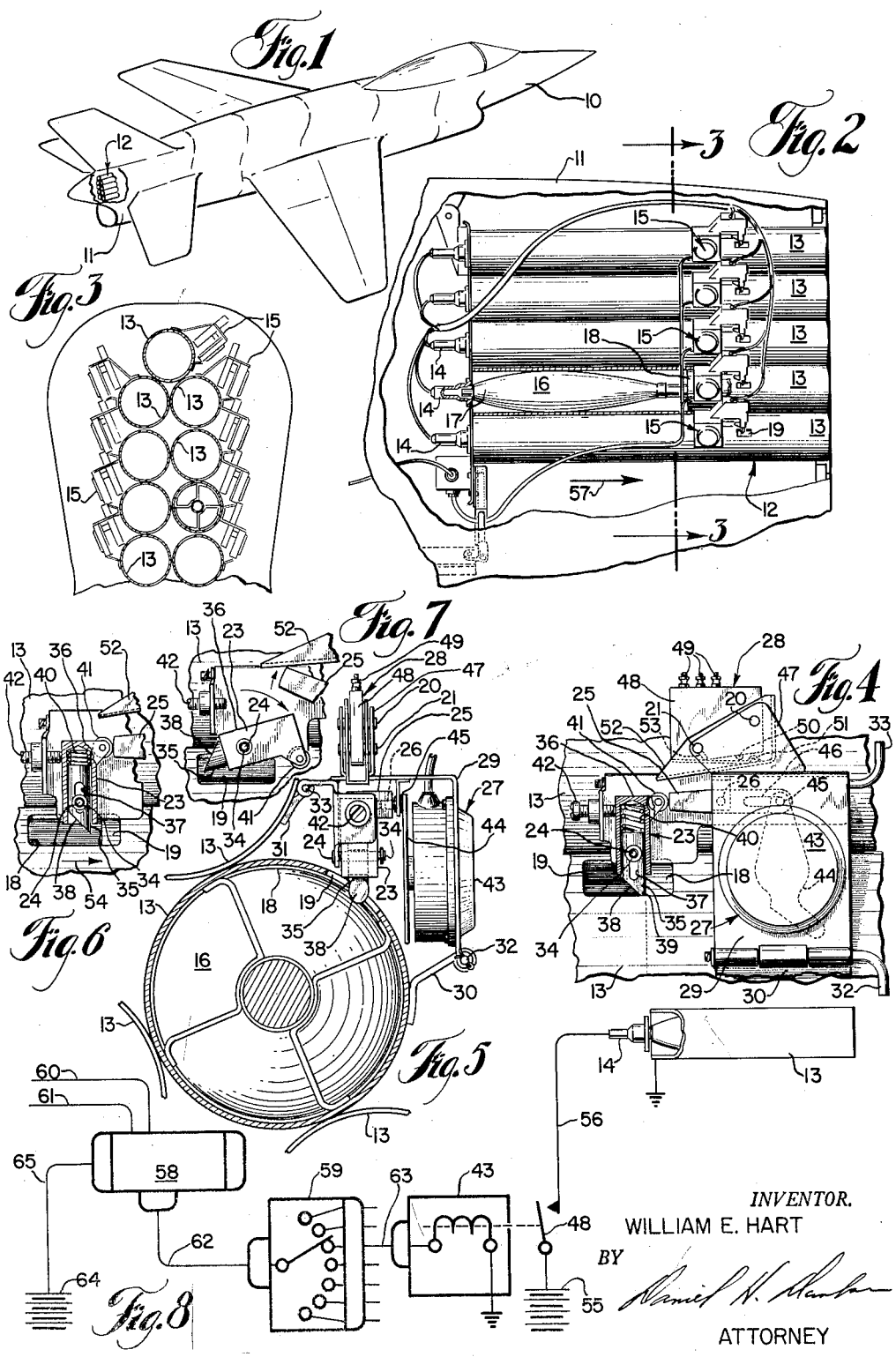
INVENTOR.
WILLIAM E. HART
BY
ATTORNEY 
United States Patent Office 2,982,180
Patented May 2, 1961

2,982,180
STORES LAUNCHER

William E. Hart, Columbus, Ohio, assignor to North American Aviation, Inc.

Filed Mar. 21, 1958, Ser. No. 723,061

5 Claims. (Cl. 89—1.5)

This invention pertains generally to a stores launcher, and relates more particularly to an improved launcher arrangement which may be advantageously utilized in military aircraft applications and the like.

The development of attack-type aircraft utilizing a concept of rearward stores ejection has required that suitable means be provided for the launching of military stores carried therein. In order that the delivery aircraft might have maximum effectiveness, it is required that the stores launching arrangement utilized therein be provided with numerous capabilities.

Accordingly, it is an object of this invention to provide a stores launcher assembly which may be utilized to positively eject contained stores from within the assembly throughout all its possible attitudes.

Another object of this invention is to provide a stores launching assembly with features which retain stores positioned therein in a proper position for ejection throughout varied attitudes of the launching assembly, and throughout all positions of a delivery aircraft incorporating such launching assembly.

A still further object of this invention is to provide a stores launching assembly having essentially mechanical retaining means for contained stores, and having electrically controlled ejection means for such contained stores.

Another object of this invention is to provide a stores launching assembly with an interlock feature intermediate a stores-retaining feature and an electrically controlled ejector feature.

Another object of this invention is to provide a launching assembly for stores and the like wherein the control for actuating an ejector component is utilized to make a stores retainer component inoperative prior to actuation of that ejector component.

Another object of this invention is to provide an arrangement for launching stores and the like which is relatively simple in operation, which may be economically manufactured, and which has a high degree of operational reliability.

Other objects and advantages of this invention will become apparent during consideration of the drawings and detailed description.

In the drawings, wherein like numerals are employed to reference like components throughout the same:

Fig. 1 is a perspective view of an airplane having a rearward-ejecting stores launching assembly provided in the aft portion thereof;

Fig. 2 is an enlarged elevational view of the stores launching assembly shown in Fig. 1;

Fig. 3 is a sectional view taken along the line 3—3 of Fig. 2;

Fig. 4 is a side elevational view of a portion of the launcher assembly of Fig. 2 showing features of this invention incorporated therewith;

Fig. 5 is a transverse elevational and sectional view of the arrangement of Fig. 4;

Figs. 6 and 7 are elevational views of a portion of the launcher assembly of Figs. 4 and 5 showing certain operational characteristics; and Fig. 8 is a schematic wiring diagram of circuitry which may be employed with the launcher assembly of Fig. 2.

Airplane 10 of Fig. 1 is illustrated as utilizing an operating concept of rearward stores ejection in military attack missions, and a portion of its empennage portion 11 has been removed to illustrate a stores launcher assembly 12 contained therein. The particular launcher embodiment of Figs. 1 through 3 may be made capable of ejecting several stores units either simultaneously or sequentially.

Assembly 12 is illustrated in Fig. 2 as being essentially comprised of a plurality of store supports 13, each provided with store thruster means 14 and retainer means 15 for the store contained therein. Nose portion 17 of store 16 preferably cooperates with the ejection means 14 and the tail portion 18 of the store cooperates with a component of retainer unit 15 that projects interiorly of support 13 through opening 19. Attaching bracketry may be utilized to secure launcher assembly 12 to structural components contained within empennage 11.

Details of retainer means 15 for an individual store support 13 are illustrated in Fig. 4. The features of retainer means 15 include: a stop portion, designated generally as 23, which pivots about pin 24; a lock bar portion 25 which pivots about pin 26, and driver means 27 for the lock bar 25. The retainer means also includes an interlock portion 28 which cooperates with an individual thruster 14 and with lock bar portion 25. The various portions of retainer means 15 are supported by L-shaped bracket 29 and are preferably rigidly secured thereto. As illustrated in Figs. 4 and 5, bracket 29 may be removably attached to the stores support members of assembly 12 through the use of cooperating brackets 30 and 31 and pins 32 and 33.

The stop portion 23 of retainer means 15 is comprised of a stop 35 and a stop casing 36. Both stop 35 and casing 36 pivot about axis 24. Stop 35 is provided with a through slot 37, a bevel surface portion 38, and a store contact surface portion 39. Stop 35 is assembled in casing 36 with pivot pin 34 extending through its slot portion 37 and a spring 40 is provided interiorly intermediate casing 36 and stop 35 to urge stop 35 outwardly until an extreme of slot 37 contacts pin 34. A roller contact 41 is mounted on stop casing 36 to provide rolling contact as between stop portion 23 and lock bar portion 25. An adjusting screw 42 is provided in cooperation with a portion of bracket 29 and stop means 23, and may be utilized to adjust the contact relation as between stop 35 and locking bar 25.

Driver means 27 may preferably consist of an electrically actuated rotary solenoid 43 or the like, supported by bracket 29, an actuating arm 44 rotated by the solenoid, and a lug or pin 45 secured to an end portion of arm 44. Pin 45 cooperates with the slot 46 provided in lock bar 25.

Interlock portion 28 is mounted upon the bracket 29 by means such as sub-bracket 47 and fastener means 20 and 21. Switch portion 48 may be preferably of a miniaturized pressure-sensitive type, and is typically provided with terminals 49 for wiring the switch as a normally open or normally closed type. Switch unit 48 may be further provided with a projecting stud 50 for actuating an interiorly contained switch contact blade. A leaf 51 cooperates with stud 50 and switch actuator 52. It should be noted that actuator 52 pivots about fastener means 20 and is provided with a limiting slot 53 which cooperates with the fastener 21.

When an actuating signal is circulated to solenoid 43, arm 44 is caused to rotate in a counterclockwise direction with respect to Fig. 4. Through the pin-slot contact with lock bar 25, counterclockwise rotation of arm 44 causes lock bar 25 to be pivoted clockwise and out of engagement with roller contact 41 of stop means 23. Means 23 is then free to pivot in a clockwise direction as in Fig. 7. Also, as illustrated in Fig. 7, continued clockwise rotation of bar 25 by arm 44 brings it into contact with actuator 52 of the interlock assembly 28. As actuator 52 is rotated in a clockwise direction about its pivot axis 20, switch actuator 52 moves leaf 51, and the stud portion 50 of the pressure-sensitive switch is also moved. This then preferably results in the completion of a circuit through switch 48 to an ejector 14 associated therewith.

Fig. 6 illustrates a feature of the stop means 23 whereby a store may be inserted in assembly 12 without requiring that various portions of the assembly be disengaged from each other. As a store fin portion 18 is moved into contact with bevel surface portion 38 of means 23 in the direction of the arrow 54, stop 35 is caused to move upwardly against the action of spring 40. When the stop 35 clears tail portion 18, that component will return to the position shown in Fig. 4. Store 16 is then restrained longitudinally in support 13 by thruster 14 and stop 35 of stop portion 23. Transverse movement of store 16 is limited by support 13 itself.

Fig. 8 illustrates a typical circuit arrangement which may be utilized with the embodiment of this invention illustrated in Figs. 1 through 7. The electrically primed thrust means 14 is actuated by completing an electrical circuit from power source 55 and through switch 48 and line 56 to ground. The completion of such a circuit results in detonation of the thruster means explosive charge and in a rearward ejection of store 16 in the direction of arrow 57 of Fig. 2.

Control over the ejection of a store such as 16 is obtained basically through the utilization of computer means 58, selector switch 59, and relay 43. Various informational inputs are fed to computer 58 from various sources through the lines designated 60 and 61. Such information may relate to parameters such as altitude, velocity, distance to target, and the like. Selector switch 59, if utilized, cooperates with computer 58 through conductor 62, and with relay 43 through conductor 63. This component may be utilized in connection with launcher assemblies having multi-store unit capability such as in a device for the launching of practice stores. If launcher assembly 12 is designed with respect to a single stores unit, utilization of component 59 is not required, and computer 58 may be made to cooperate directly with relay 43 through a single conductor means.

When a proper instant for firing a store has been determined by the computer, an electrical circuit is completed from the power source 64, through line 65, through the circuit-closing action of computer 58, through line 62, through selector switch 59, through line 63, and thence to ground by way of the coil of relay 43. Completion of the circuit results in relay 43 causing switch 48 to close its contact points thus actuating ejector means 14.

Thus, it will be noted from the drawings that store 16 is secured in place with respect to ejection means 14 until such time as it is to be fired from within the launcher assembly 12. Upon receipt of a firing signal, stop means 23 are freed from pivotal restraint by action of solenoid 43 prior to completion of the priming circuit through interlock portion 28. Upon the firing of ejector means 14, store 16 is moved rearwardly from the launching assembly and its tail portion 18 causes stop means 23 to pivot in a clockwise manner (Fig. 4) thus store 16 is permitted to be ejected without interference by retainer means 15.

From the above description it may be noted that the launching assembly of this invention is provided with arrangement whereby a store may be positively ejected from the assembly regardless of assembly orientation or position. Also, retainer means 15 will effectively restrain a store in its proper pre-ejection position at all times prior to firing, even though the position of the launcher be substantially changed. The arrangement also provides a positive stop feature which must be made inoperative prior to completion of an electrically controlled firing circuit. Other advantages of this invention were noted previously in this specification.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:

1. A launcher assembly for carrying and ejecting a store, and comprising: a support member positioning the store, thruster means connected to said support member at one end of the store to restrain the store from movement in a first direction and primed electrically to eject the store in a second direction, retainer means connected to said support member and projected into the ejection path of the store to restrain the store from movement in said second direction, and circuit means electrically connected to said thruster means and completed to electrically prime said thruster means, said circuit means being connected to and completed by said retainer means to electrically prime said thruster means after said retainer means releases the store for movement in said second direction.

2. The launcher assembly defined in claim 1, wherein said retainer means includes a rotatably supported stop portion projected into the ejection path of the store, an interlock switch portion connecting said retainer means to said circuit means, and a drive means portion rotated from a first position to a second position, said drive means portion restricting rotational movement of said stop portion in one direction when in said first position and closing said interlock switch portion when rotated to said second position to complete said circuit means and prime said thruster means.

3. The assembly defined in claim 2, wherein said stop portion is projected into the ejection path of the store substantially at a right angle relative thereto, said stop portion being rotated from said right angle position and out of the ejection path by the store when the store is ejected by said thruster means.

4. The launcher assembly defined in claim 2, wherein said retainer means also includes a rotatably supported lock bar portion arranged in contacting relation to said stop portion, said lock bar portion being connected to said drive means portion and having an axis substantially at a right angle to said stop portion when said stop portion is projected into the ejection path of the store and when said drive means portion is in said first position.

5. In an assembly for carrying and ejecting a store, in combination: a support member carrying the store, electrically primed thruster means connected to said support member in contacting relation to the store to initially restrain the store from movement in a first direction and thereafter eject the store along an ejection path in a second direction, first circuit means connected to said thruster means and having a normally-open interlock switch means which completes an electrical circuit from a source of electrical energy to said thruster means when closed, stop means rotatably connected to said support member and projected into said ejection path aft of the store to restrain the store from movement in said second direction only, drive means rotated from a restraining relation with said stop means to a contacting relation with said interlock switch means when energized, and separate circuit means connected to said drive means and selectively energized as a firing circuit to eject the store from said support member, said separate circuit means sequentially releasing said stop means for rotation by the store and closing said interlock switch means when energized to complete said first circuit means and to prime said thruster means.

References Cited in the file of this patent

UNITED STATES PATENTS

| | | |
|---|---|---|
| 2,381,332 | Boldt | Aug. 7, 1945 |
| 2,548,053 | Pierson et al. | Apr. 10, 1951 |
| 2,751,818 | Bonnett | June 26, 1956 |
| 2,764,066 | Doak et al. | Sept. 25, 1956 |
| 2,830,496 | Anderson et al. | Apr. 15, 1958 |